Feb. 26, 1946.    J. B. BRENNAN ET AL    2,395,448
METHOD OF MAKING SCREEN STENCILS
Filed Oct. 11, 1941    2 Sheets-Sheet 1

INVENTORS
JOSEPH B. BRENNAN
& F. LEONA MARSH
BY
Bosworth & Sessions
ATTORNEYS

Feb. 26, 1946. J. B. BRENNAN ET AL 2,395,448
METHOD OF MAKING SCREEN STENCILS
Filed Oct. 11, 1941 2 Sheets-Sheet 2

INVENTORS
JOSEPH B. BRENNAN
& E. LEONA MARSH
BY
Bosworth & Sessions
ATTORNEYS

Patented Feb. 26, 1946

2,395,448

UNITED STATES PATENT OFFICE 2,395,448

METHOD OF MAKING SCREEN STENCILS

Joseph B. Brennan and Emma Leona Marsh, Euclid, Ohio; said Marsh assignor to said Brennan Application October 11, 1941, Serial No. 414,566

7 Claims. (Cl. 101—128.2)

This invention relates to the art of preparing screen stencils to be used to decorate objects of plane or irregular surfaces. This application constitutes a continuation in part of our copending application Serial No. 175,240, filed November 18, 1937, which in turn was a continuation in part of our application Serial No. 115,208, filed December 10, 1936, now Patent No. 2,213,237.

Our patent aforesaid discloses screen stencils composed entirely of metals or inorganic materials, and claims screen stencil plates of such materials and which are adapted to have designs etched therein, the screen being filled in with a material different from the material of the screen so that the filling in material can be etched away, to produce the stencil design, without destroying the screen. The present application relates to screen stencils and methods of making the same and particularly to efficient and economical methods of producing designs in screen stencils composed of metals or inorganic materials by photographic processes.

Screen stencils of this type are advantageous in that they are not affected by inorganic and organic solvents such as water, alcohol, ether, benzene or carbon tetrachloride, and do not change with variations in atmospheric conditions, whereas the design of light exposed, sensitized gelatin or similar material produced on the silk screen stencils ordinarily employed is susceptible to atmospheric changes. The designs are of colloidal nature, and the accuracy of such desgins is not only decreased by mechanical wear during use, but the colloidal film varies with changes in temperature and humidity, resulting in a stencil usable for a limited period only and which is only slightly resistant to water. The present invention provides a stencil screen which is comparatively indestructible, and which does not have the limiting features of the colloid screen.

Figure 1:
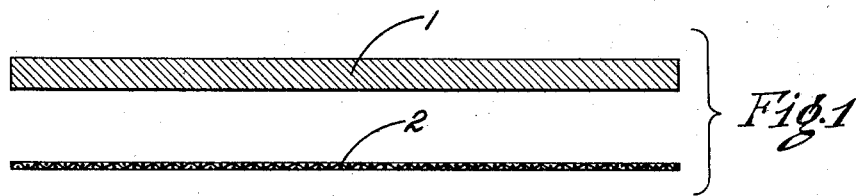
Figure 2:
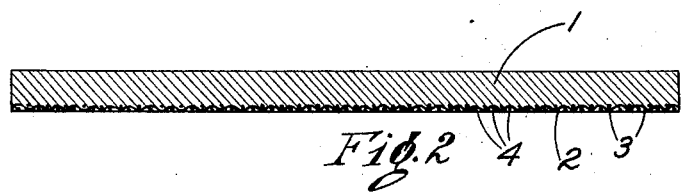
Figure 3:
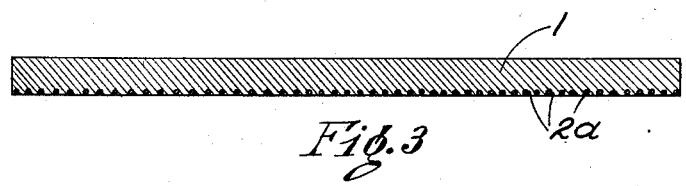
Figure 8:
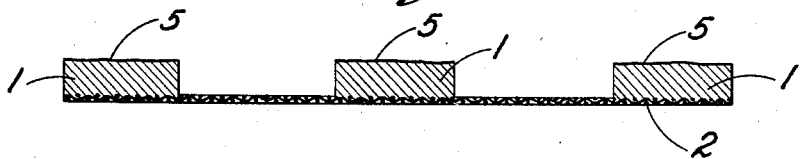
Figure 9:
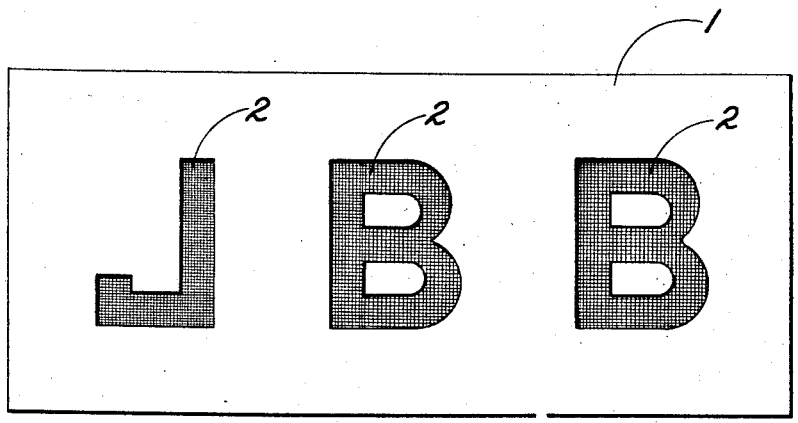

Referring to the drawings in which our invention is illustrated somewhat diagrammatically, Fig. 1 is an enlarged cross-sectional view of a metal layer and a woven screen prior to assembly; Fig. 2 is an enlarged cross-sectional view of the metal layer and screen joined together; Fig. 3 is an enlarged cross-sectional view of a screen embodying non-woven, attenuated members or wires; Figs. 4 to 7, inclusive, are enlarged cross-sectional views illustrating steps in our method; Fig. 8 is an enlarged cross-sectional view of the finished stencil; and Fig. 9 is a plan view thereof.

The first step in making our screen stencils is to provide a screen stencil plate such as described in our patent aforesaid, preferably by partially embedding sheet material such as a metal or other material of similar mechanical resistance, into a screen composed, for example, of a dissimilar metal screen or of glass fabric. This may be accomplished by methods described in our said patent. A rapid method of attaching the sheet material such as a metal sheet to the screen comprises the hot or cold extrusion or pressing of the metal into the screen. Also, as disclosed in our said patent, the screen may be provided with a layer or sheet of metal by other methods such as the following:

(a) Metal spraying with a metallizing gun so that the interstices of the metal screen are filled in and covered on one side or on both sides with a layer of metal dissimilar to that of which the screen is composed. Simultaneously with the spraying of this layer of dissimilar metal or subsequently thereto the resultant structure may be subjected to heat and/or pressure so that a more closely knit and more flexible unitary structure results.

(b) A screen of Monel metal or stainless steel may be dipped in a molten bath of tin and while hot passed through rolls under presure to secure the unitary structure.

(c) The metal screen may be immersed as a cathode in an electro plating bath and the interstices of the screen filled in with a layer of dissimilar metal. In case roughness and irregularity develops by this process before the interstices are completely filled in, the electrodeposition may be carried on to form a thicker layer than is needed and subsequently the rough unitary structure so produced may be polarized anodically and the high spots of the structure redeposited therefrom so that a smooth unitary structure results.

If preferred, after the initial electrodeposition, the rough unitary structure may be subjected to heat and passed through rolls under pressure so that the thickness and smoothness desired may be secured.

(d) A layer of copper plated iron or steel foil may be attached to one side of the screen of dissimilar metal such as Monel metal ("monel" is a trade-name for an alloy containing nickel and copper) by means of so-called hydrogen brazing, pressure being applied during the operation and the same being carried out in a non-oxidizing atmosphere.

All of the above methods produce structures in which the screens are at least partially filled in with a metal chemically different from the material of the filaments making up the screens, thus permitting the filling-in metal to be etched away without dissolving the screen. A smooth layer of metal results on one side while the screen embedded in the metal may be visible on the other side of the joined materials in case the metal is only partially embedded. If desired, the screen may be sandwiched between two layers of metal. The extrusion of the metal into the screen may be accomplished with or without heat. It can also be accomplished without removing the atmospheric oxide films from the metal and the screen. We prefer to use a soft tempered metal or an annealed metal for the extrusion into the screen since the working of the metal may cause a slight hardening. The combined tensile strength of the metal screen structure is a greater than that of either the metal or the screen. By partially embedding the metal into the screen, the etching solution has less chance to corrode the screen while etching out the uncovered portion of the metal.

As shown in Fig. 3, if desired a layer of fine parallel wires 2a may be employed instead of a woven screen. In some instances, a single layer of wires as shown in Fig. 3 will be sufficient. In other instances, depending on the service and the character of the design, it is preferable to use two layers of wires extending preferably at right angles to each other. The wires may be held taut while pressure is applied to embed them into the sheet, thus producing a stencil plate with an unwoven screen.

After the sheet material such as metal and the screen are joined by any of the disclosed methods the resulting structure may be used in a flat form or shaped to conform to an irregular object. This shaping can be accomplished after the metal is embedded in the screen or the metal and the screen can be separately shaped and joined by pressing together as in a mold or die.

Figure 4:
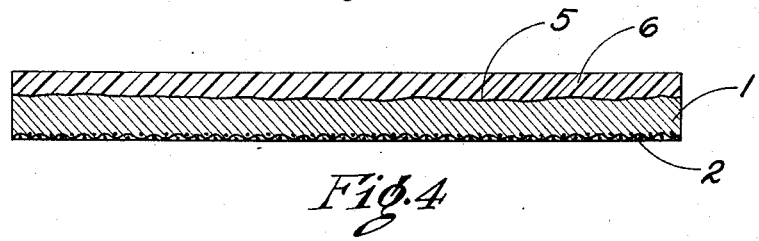

According to our invention, the desired design is etched into the stencil plate by subjecting the plate to the action of a reagent that will dissolve the filling-in metal without substantially attacking the screen. Preferably the design is etched through a photographically prepared resist. Because of the fact that the design is etched clear through the plate, the ordinary gelatine resist does not give the best results. In order to obtain a clear, sharp and accurate stencil we preferably form the resist by the following method:

The first step of the process consists in roughening the smooth surface of the plate as indicated at 5 in Fig. 4. This roughening or graining may be accomplished by various methods such as etching or sandblasting. The roughened surface is then cleaned by any familiar cleaning method as very dilute acid and water wash, preparatory to producing a design on the metal screen.

Next, a sensitized colloidal layer of bichromated albumen, gelatin or similar material 6 may be applied to the roughened surface 5, dried as with a fan at room temperature and exposed to a light source to produce the desired image which is further treated with a greasy solvent such as greasy ink in turpentine to make the image more water-resistant.

Figure 5:
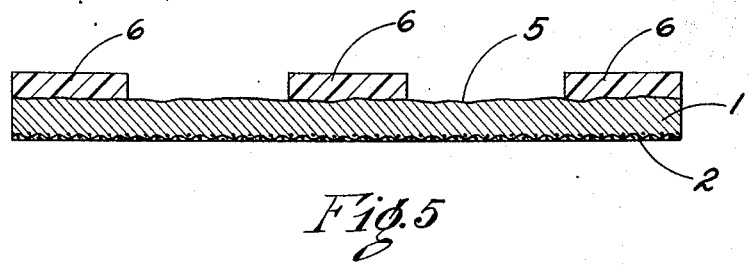
Figure 6:
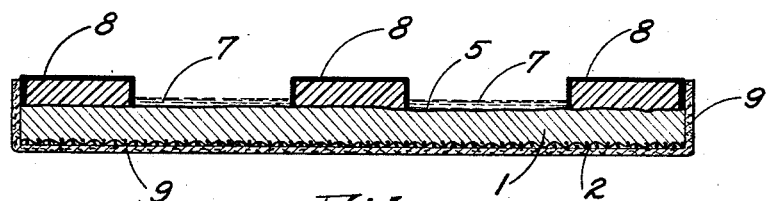

The unexposed portions of the sensitized colloid are removed with a developer and the resulting design 6, Fig. 5, is dried at the desired temperature. After producing an image on the roughened surface in Fig. 6, the uncovered areas of the metal are kept in a condition in which they are receptive to the etching solution by applying an etchant absorber or accelerator 7, Fig. 6, on the surface of the metal from which the unexposed portions of the sensitized colloid have been removed. For example, a solution of a polyhydric alcohol and a salt which is sufficiently hygroscopic to maintain a wetted surface may be applied, the greasy material on the image preventing this solution from adhering thereto. Next, a greasy ink 8 is applied as by means of a transfer roller to the treated surface, the etchant accelerator repelling the ink from the exposed metal surfaces and allowing the ink to be absorbed only by the remaining colloid design. The greasy ink completely penetrates the photographic image so that it is thoroughly protected, by the etchant resistant ink applied thereto, against the encroachment of the etchant. A coating of wax 9 is then applied to protect the under side and the edges of the metal structure during the etching.

The uncovered portions of the metal surface are removed by immersing in an etching solution which will not react with the metallic screen, preferably consisting of a metallic salt to which an acid may be added. A salt of a metal below the metal to be etched in the electrochemical series can be used in a solution having a pH less than 7. For example, a solution of 30 gms. copper sulfate and 150 c. c. hydrochloric acid made up to 1 liter with water, or a solution of copper chloride, may be used as the etchant with aluminum or tin sheets. During the etching process the metal of the etching salt replaces the metal on the surface being etched, this metal being deposited in small globules. These globules of copper, if a copper salt is the etchant, may be removed by a chemical such as nitric acid which readily reacts with the copper but will not react with the metal being etched. The reactions involved in etching the stencil give satisfactory results at room temperature or slightly above room temperature.

The uncovered metal can also be removed electrolytically at a current density of .5 ampere per 100 sq. dm., or less. We have found a wide variation of electrolytes can be used including acid halogen salts, acid halogen salts and an acid, acid salts and a halogen acid, neutral halogen salts, neutral halogen salts and an acid, neutral salts and a halogen acid, ammonium halogen salt, and ammonium halogen salt and ammonium hydroxide to produce an alkaline solution.

Figure 7:
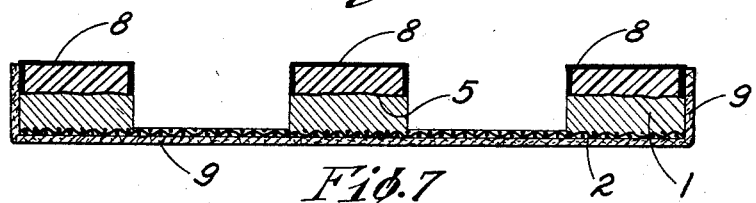

Fig. 7 shows the screen stencil after etching out the unprotected metal. The design is accurately reproduced, for the resist, impregnated with the greasy ink, is able to withstand the action of the etchant so that the stencil can be etched all the way through in a single operation.

After etching, the stencil is rinsed in gasoline, benzene, carbon tetrachloride or similar solvent to remove the wax and most of the greasy ink. The stencil is then washed in warm water to produce a clean completed screen stencil. A small amount of denaturated alcohol added to the water will facilitate the washing of the screen stencil after etching.

The all metal screen stencil produced by the above means may be used to apply glue and rubber designs in order to form a sandblast resist pattern.

This screen stencil may also be used for dyeing fabrics and especially thick fabrics such as rugs by applying suction to one side of the fabric and applying the dye through the screen on the other side. Thick, porous, fibrous sheet material may be impregnated in color areas by applying suction to such porous sheet material and screening thereon while under suction.

It is understood that multiple layers of woven filaments and sheet material may be combined by pressure for the purposes of the application also.

This process has advantages in the deep etching of metals for printing and for perforating sheets quickly and economically and accurately. Thus sheet metal stencils may be made with intricate, photographic designs using the grease inked image as a resist pattern. Likewise, sheet metal may be finely perforated as for a screen or filter member by first producing a photographic image thereon and inking same and etching thereafter. The peculiar advantage of using this method in etching metal printing plates lies in the fact that a peculiarly deep etch, say to ten thousandths of an inch, is easily procurable in a few minutes of etching, without requiring intermediate treatments of the resist.

We claim:

1. A method of making metallic screen stencils which includes the steps of forming a screen stencil plate comprising a metal screen composed of stainless steel and having the interstices thereof at least partially filled by a layer of tin intimately joined thereto, applying a colloidal resist to a portion of the area of said plate, applying an etchant absorber to the areas of the plate not protected by the resist, inking the resist with a greasy ink, and subjecting the plate to the action of a reagent adapted to dissolve said metal from the interstices of said screen without substantially attacking the metal of the screen and the resist, thereby dissolving the metal from the interstices of said screen without dissolving the screen in the portion of the area of said plate which is not protected by the resist.

2. The method of making metallic screen stencils which includes the steps of embedding a fine screen in a sheet of metal having different chemical characteristics from the material of the screen, applying a resist to said metallic sheet, applying an etchant absorber to the areas of said sheet not protected by said resist, and applying a greasy ink to the resist, and subjecting said sheet having said screen embedded therein to the action of a reagent adapted to dissolve the metal of said sheet without substantially attacking the material of the screen or the resist and thereby dissolving the metal sheet from the screen in the portion thereof which is not protected by the resist.

3. A method of making metallic screen stencils which includes the steps of making a screen stencil plate by filling in the interstices of a fine metallic screen with a metal having different characteristics from the metal of the screen, applying a resist in the form of a design to the surface of said filled in metal, applying an etchant accelerator to the portion of said surface not protected by said resist and an etchant resisting material to said resist, and subjecting the plate to the action of a reagent adapted to dissolve the filled in metal without substantially attacking the metal of the screen and thereby providing said plate with a design conforming to said resist.

4. A method of making metallic screen stencils which includes the steps of making a screen stencil plate by filling in the interstices of a fine metallic screen with a metal having different characteristics from the metal of the screen, providing the filled in metal with a smooth surface, applying a resist in the form of a design to said smooth surface of said filled in metal, applying a greasy ink to said resist and an etchant accelerator to the portion of said surface not protected by said resist, and subjecting the plate to the action of a reagent adapted to dissolve the filled in metal without substantially attacking the metal of the screen and thereby providing said plate with a design conforming to said resist.

5. The method of making metallic screen stencils which includes the steps of embedding a layer of unwoven parallel filaments in a sheet of metal having different chemical characteristics from the material of the screen, applying a resist to said metallic sheet, applying an etchant absorber to the areas of said sheet not protected by said resist, and applying a greasy ink to the resist, and subjecting said sheet having said screen embedded therein to the action of a reagent adapted to dissolve the metal of said sheet without substantially attacking the material of the screen or the resist and thereby dissolving the metal sheet from the screen in the portion thereof which is not protected by the resist.

6. The method of making metallic screen stencils which includes the steps of forming a screen stencil plate comprising a screen composed of filaments of an etchant resisting material having the openings thereof at least partially filled with a metal having different chemical characteristics from the material of the screen, applying a resist to said plate, applying an etchant absorber to the areas of said plate not protected by said resist, and applying a greasy ink to the resist, and subjecting said plate to the action of a reagent adapted to dissolve the metal without substantially attacking the material of the screen or the resist and thereby dissolving the metal from the screen in the portion of the plate which is not protected by the resist.

7. The method of making metallic screen stencils which includes the steps of forming a screen stencil plate comprising a screen composed of filaments of an etchant resisting material having the openings thereof at least partially filled with a metal having different chemical characteristics from the material of the screen, applying a resist to said plate, applying an etchant absorber to the areas of said plate not protected by said resist, and subjecting said plate to the action of a reagent adapted to dissolve the metal without substantially attacking the material of the screen or the resist and thereby dissolving the metal from the screen in the portion of the plate which is not protected by the resist.

JOSEPH B. BRENNAN.
EMMA LEONA MARSH.